July 7, 1964

P. W. THORNHILL 3,139,989

BUFFERS AND DRAW-GEAR FOR RAILWAYS, TRAMWAYS
AND LIKE VEHICLES

Filed April 27, 1961

INVENTOR
Peter Warborn Thornhill
BY
Stevens, Davis, Miller & Mosher
ATTORNEYS

United States Patent Office 3,139,989
Patented July 7, 1964

3,139,989
BUFFERS AND DRAW-GEAR FOR RAILWAYS,
TRAMWAYS AND LIKE VEHICLES
Peter W. Thornhill, Ufton, Leamington Spa, England,
assignor to Opee Limited, Leamington Spa, England
Filed Apr. 27, 1961, Ser. No. 106,126
Claims priority, application Great Britain Apr. 27, 1960
9 Claims. (Cl. 213—223)

This invention relates to hydraulic buffers and draw-gear for railway, tramway or like vehicles of the kind having a plunger and cylinder unit, the plunger of which is forced into the cylinder when a load is applied to the buffer to displace liquid, resilient means such as a mechanical spring, compressed air or other gas being utilised as a spring medium to obtain slow closure resistance and recoil.

Up to the present time it has been usual with hydraulic buffers of the kind referred to above to employ a spring medium such that the force at the commencement of closure is, say, approximately one ton per buffer rising to between six and ten tons per buffer when fully closed. Operational experience with long freight trains has shown, particularly when powerful braking on the locomotive only is used, that excessive "run-in" or "bunching up" of the wagons occurs due to the comparatively small force required to close the buffers slowly. The "run-in" is considered undesirable as it can result in severe coupling snatches under certain running conditions.

Whilst it is, therefore, highly desirable to increase the slow closure resistance considerably to, say, ten tons per buffer after only a small travel, it is also essential that the recoil force remains as low as possible in order to avoid subsequent snatch in the couplings and the problem therefore cannot be solved merely by increasing the strength of the resilient means forming the spring medium. We have found however that such conditions for buffer operation can be attained by providing an arrangement by means of which, during slow inward movement of the buffer plunger, the resistance to such inward movement can be increased above the resistance that would normally be provided by the spring medium. The required result is obtained according to the invention by providing in a buffer of the kind above referred to, a valve arranged to resist the flow of hydraulic fluid displaced during inward movement of the plunger until a predetermined pressure is reached whereupon the said valve permits the flow of hydraulic fluid therethrough at a controlled pressure.

The valve may consist of a simple spring loaded type valve which in effect adds only a predetermined resistance to the spring medium throughout the inward stroke of the plunger. Alternatively a proportional type valve can be used which is acted upon by the spring medium whereby the resistance can be raised by a predetermined ratio above the spring medium at any point in the plunger stroke. For example, if the spring medium gave a resistance commencing at one ton rising to six tons at full closure, the spring type relief valve could be set for nine tons which would give a combined resistance of ten tons rising to fifteen tons. The proportional type valve could however be designed with a 10:1 ratio which would give ten tons rising to sixty tons. It is also possible for a combination of the two types of valves to be used, for example, the proportional type valve can be utilised to control the pressure up to a predetermined value after which the spring loaded valve becomes effective.

As the valve is arranged so that it operates to provide increased slow closure resistance, the same is advantageously used in conjunction with a controlled orifice through which the liquid is displaced upon buffer operation, the said controlled orifice acting in the usual manner to deal with heavy impact loads.

In such a construction the valve is arranged in series with the controlled orifice and must therefore be capable of permitting the increased flow of hydraulic liquid resulting from dynamic impact. Further, as the valve permits only the flow of hydraulic liquid during inward movement of the plunger, provision must be made to allow reverse flow of the liquid upon outward movement of the plunger. For example, a non-return valve can be provided which opens during outward movement of the plunger to permit the hydraulic fluid to by-pass the valve and flow in the reverse direction.

Although the increased resistance is desirable for the reasons already mentioned, it is not necessarily desirable that it should be effective from the very commencement of inward movement of the buffer plunger as when negotiating sharp curves in the track a certain amount of closure at low resistance is advantageous to relieve the strain on the couplings and wheel flanges. This can be arranged by providing an additional flow passage to by-pass the valve for a predetermined length of plunger travel in the inward direction, after which this passage is closed and the valve becomes effective. The passage can be arranged to have a progressively reduced flow area as the buffer closes in order that the buffer resistance should increase progressively.

Embodiments of the invention will now be described by way of example by aid of the accompanying diagrammatic drawings in which:

FIGURE 3 is a longitudinal section through a hydro-mechanical buffer according to the invention.

Figure 1:
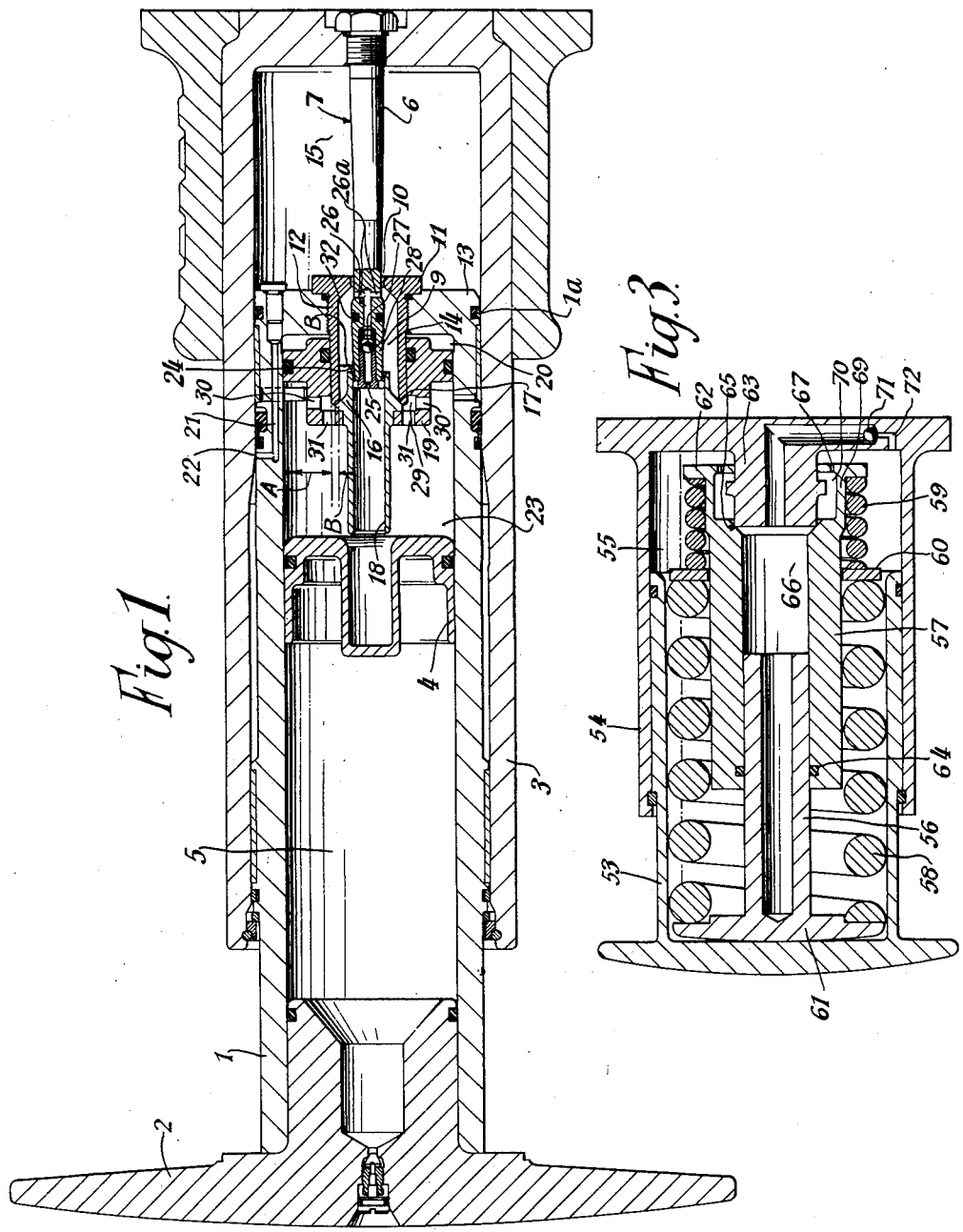
FIGURE 1 is a longitudinal section through a hydro-pneumatic buffer according to one embodiment of the invention.

In the hydro-pneumatic buffer according to FIGURE 1 of the drawings the buffer plunger 1 carrying the buffer head 2 at its outer end is axially slidable in a cylinder 3 the hydraulic fluid flowing between the buffer cylinder and buffer plunger passing through a metering device consisting of an orifice and a stationary pin having a tapered shank extending through the orifice. Under impact the hydraulic fluid entering the buffer plunger effects displacement of a floating piston 4 against air pressure in the space 5 in the buffer plunger interior between the floating piston 4 and the buffer head. The above described features of construction of the buffer are generally well known.

In accordance with the invention and in the embodiment shown in FIGURE 1 the stationary pin 6 of the metering device is carried by and projects forwardly from the closed end of the buffer cylinder 3. The shank of the stationary pin 6 has a tapered portion 7 the outer end or nose portion 9 of the shank also being tapered. The stationary pin 6 co-operates with an orifice 10 to provide the metering device, the orifice 10 being provided in the flanged end 11 of a sleeve 12 carried by the buffer plunger. The sleeve 12 extends through the end wall 13 at the inner or closed end of the buffer plunger the sleeve being screwed into a suitably threaded hole in the said end wall.

The nose end portion 9 of the stationary pin 6 extends into the bore of the sleeve 12 and forms an annular chamber 14 with the surrounding wall of the sleeve bore. This annular chamber 14 is open to the oil space 15 in the buffer cylinder 3 through the orifice 10 but is closed at its opposite end by a valve 16 seated against a seating 17 at the outer end of the sleeve 12. The valve 16 has a tubular valve stem 18 by which it is secured to a piston 19 slidable in the bore of the buffer plunger and slidably supported on the periphery of the sleeve 12, the piston 19 forming a space 20 between its rear wall and the opposite face of the end wall of the buffer plunger 1. The space 20 is maintained at atmospheric pressure through the passage 21 and radial drilling 22 in the wall of the buffer plunger. The nose end 9 of the stationary pin extends into the bore of the tubular stem 18, the annular chamber 14 normally being open to the fluid reservoir space 23 in the buffer plunger through a clearance 24 between the outer end of the nose portion and the bore of the tubular stem.

In FIGURE 1 the buffer is shown in the fully extended condition. In operation, during slow closure, as the buffer plunger moves inwardly hydraulic fluid is displaced from the fluid space 15 in the buffer cylinder through the orifice 10 of the metering device into the annular chamber 14, the fluid then passing through the clearance 24 and bore of the valve stem 18 into the fluid reservoir 23 of the buffer plunger. The tapered nose end 9 of the stationary pin 6, co-operating with the clearance 24 provides a progressive reduction in the area of clearance 24 during inward movement of the plunger 1, the clearance being finally obstructed by the annular sealing ring 32 on the nose of the stationary pin when said sealing ring enters the bore of valve 16. At this point of buffer closure the fluid contained within chamber 15 becomes completely sealed off from oil reservoir 23 by sealing ring 32, valve 16 and the seal 1a carried on the outside of the inner end of the plunger operating in the bore of the cylinder.

The valve 16 is held against its seating 17 by the pressure in the fluid reservoir 23 acting on the combined annular areas A and B.

Before further inward movement of plunger 1 can take place the load on the end of the plunger must be such that the pressure produced in the fluid in the chamber 15 and consequently chamber 14, must be such that this pressure acting on the annular area B to open valve 16 is greater than the pressure in chamber 23 acting on annular areas A and B. At this point valve 16 is forced out of contact with seating 17 and fluid permitted to flow from chamber 15 to the oil reservoir 23 through space 29 and drillings 30 and 31.

In this arrangement embodying the proportional type valve, the valve is so constructed that the area acted upon by the upstream fluid to open the valve is less than the area acted upon by the down stream fluid to close the valve, the ratio of the areas thus determining the resistance to closure of the buffer in relation to the resistance of the spring medium in chamber 5.

Valve 16 can only be forced off seating 17 to permit flow of fluid in the direction from chamber 14 to 23 and to permit extension of the buffer plunger 1 after seal 32 has entered the bore of valve 16, the ball valve 27 normally closed on its seating 28 during buffer closure is permitted to open and allow flow of fluid from chamber 23 to chamber 14 through passages 25, 26 and radial drillings 26a and then through orifice 10 to chamber 15. As soon as seal 32 is clear of the bore of valve 16 flow can also take place from chamber 23 to chamber 14 through clearance 24.

So far the description has applied to the operation during slow closure. During normal or heavy impacts additional resistance to the closure of plunger 1 is obtained by the restriction of fluid flow from chamber 15 through orifice 10 and valve 16 is forced off its seating 17 at a controlled pressure to permit the high flow of fluid which occurs under these conditions. The taper 7 on the stationary pin 6 is calculated to give the required dynamic characteristics through orifice 10 in combination with the resistance to flow provided by valve 16.

Figure 2:
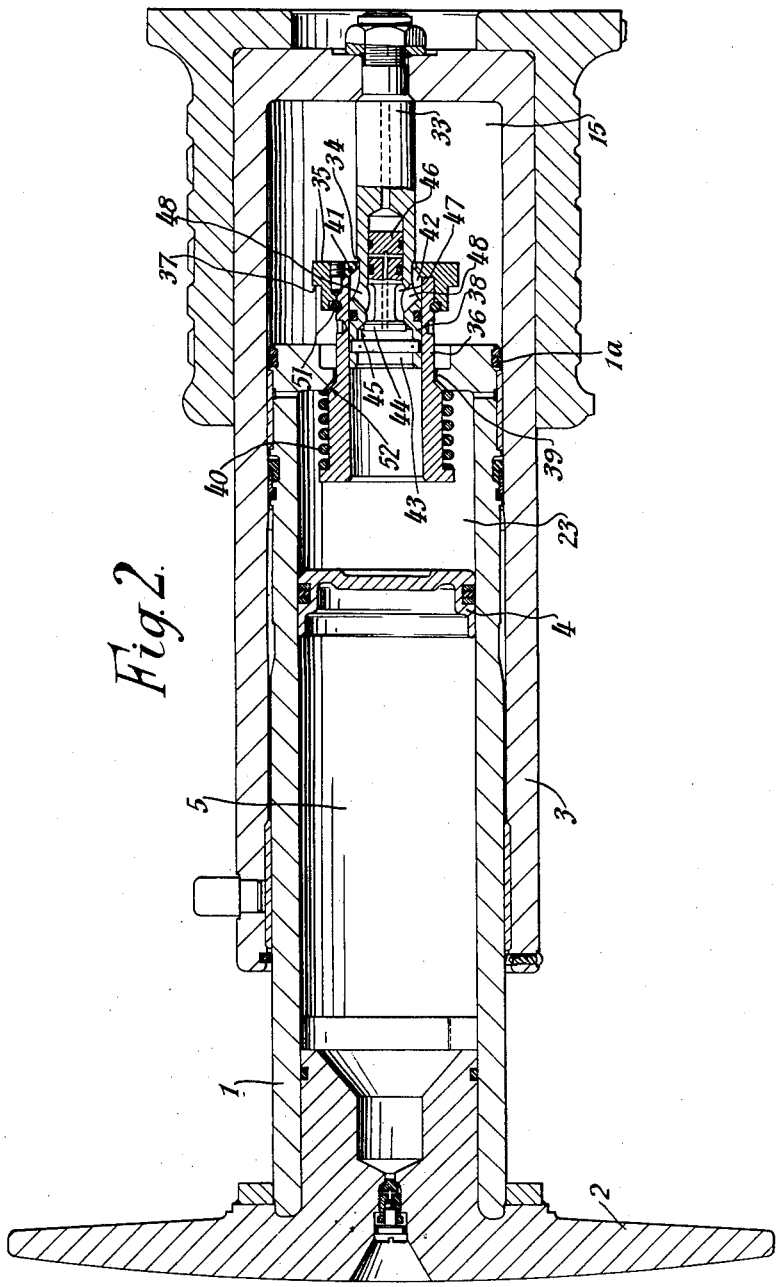
FIGURE 2 is a longitudinal section through a hydro-pneumatic buffer according to a second embodiment of the invention.

The hydro-pneumatic buffer of the embodiment shown in FIGURE 2 as in the embodiment disclosed in connection with FIGURE 1, consists of a buffer plunger 1 having the buffer head 2 at its outer end, the buffer plunger being axially slidable in a buffer cylinder 3, the hydraulic fluid flowing between the buffer cylinder and buffer plunger passing through a metering device consisting of an orifice and a stationary pin having a tapered shank extending through the orifice. Under impact the hydraulic fluid entering the buffer plunger effects displacement of a floating piston 4 against air pressure in the space 5 in the buffer plunger interior.

In the present embodiment of the invention the stationary pin 33 having the tapered shank is carried by the closed end of the buffer cylinder and projects outwardly therefrom. The stationary pin co-operates with an orifice 34 in a bush 35 screwed onto a sleeve 36 to provide a flanged end to the sleeve which end forms an external shoulder 37 on the sleeve. The outer end of the stationary pin 33 is formed as a piston head 38 which co-operates with the bore of the sleeve, the length of the sleeve being such that the opposite ends thereof extend into the buffer plunger and cylinder respectively, the sleeve passing through an aperture 39 in the inner end wall of the buffer plunger.

The buffer plunger 1 is illustrated in its fully extended position in which position it is restrained from further extension by the outward side of the inner closed end engaging a shoulder 52 around the sleeve 36, the outward limit of movement of the sleeve 36 itself being determined by engagement between the external shoulder 41 in said sleeve and the abutment provided by the end of the slots 42 on the stationary pin. The sleeve is spring loaded by a compression spring 40 the spring action operating to urge the sleeve outwardly in such a manner that during initial movement of the plunger 1 inwardly the sleeve remains stationary relative to the stationary pin until the plunger end comes in contact with the external shoulder 37 of the sleeve.

Located within a recess 43 in the piston head 38 is a poppet valve 44, the head of which co-operates with a seating 45 in the recess, the stem 46 of the valve being slidable in an axial bore in the stationary pin. The valve stem 46 is reduced for a portion of its length to provide an annular space 47 behind the valve head which communicates with the hydraulic fluid space 15 of the buffer cylinder through drillings 48 in the stationary pin, the outer end of said drillings communicating with the axial slots 42. The diameter of the seating 45 in the recess is larger than the bore in which the stem 46 is slidable so that the force acting to move the valve off its seating is controlled by the fluid pressure acting on the differential area between the valve seating and the said bore in which the valve stem 46 operates. The space at the inner end of valve stem 46 is vented to atmosphere through channel 46′ so that the force acting to retain the valve on its seating is the fluid pressure in chamber 23 acting on the valve head.

In FIGURE 2, the buffer plunger is shown in the fully extended condition and in operation during slow closure the initial inward movement of the buffer plunger displaces fluid from chamber 15 through the annular passage 49 into the oil reservoir 23. The outer surface of the sleeve preferably being tapered so that the passage is progressively reduced in area as the plunger moves forward. As the plunger approaches the abutment 37, the plunger face engages seal 51 and obstructs further flow of fluid through the passage 49, at this point the fluid in chamber 15 is completely sealed off from oil reservoir 23 by the poppet valve, seal 51 and seal 1a on the outside of the plunger operating within the bore of the cylinder. Further forward movement of the plunger can only take place when the loading on the end of the plunger is sufficient to raise the pressure in chamber 15 and consequently in the differential area of the poppet valve high enough to overcome the force acting on the head of the valve from the pressure in chamber 23 to cause the valve to lift off its seat and permit fluid to flow from chamber 15 to chamber 23 at a controlled pressure.

Extension of the buffer plunger 1 from a point beyond which contact has been made with abutment face 37 is achieved by the pressure in chamber 23 acting on the sleeve 36 against the spring 40 moving the sleeve inwardly so that fluid flow from chamber 23 through the annular space 49 to the cylinder chamber 15 is permitted thus enabling plunger extension.

The above description relates to the operation during slow closure. During normal or heavy impacts additional resistance to closure of plunger 1 is obtained by the restriction of fluid flow from chamber 15 through orifice 34, the poppet valve 44 being forced off its seating at a controlled pressure to permit the high flow of fluid which occurs under these conditions. The tapered shank of the stationary pin 33 is calculated to give the required dynamic characteristics through orifice 34 in combination with the resistance of flow provided by poppet valve 44.

According to the embodiment shown in FIGURE 3 of the drawings the invention is applied to a hydro-mechanical buffer using a mechanical spring as a spring medium. The buffer includes a hydraulic cylinder and plunger so arranged that the resistance in the closing direction of the buffer is increased above the resistance that would normally be obtained from the spring medium. In such an arrangement, additional resistance can be provided during dynamic impacts by displacing the liquid through an orifice or orifices in a manner similar to that already used in hydraulic buffers.

In the construction shown the buffer plunger 53 and cylinder 54 hereinafter referred to as the casing plunger 53 and cylinder 54 form together a closed chamber 55 partially filled with hydraulic liquid and serving as a reservoir to feed a further plunger 56 and cylinder 57 contained co-axially within the casing plunger and cylinder and hereinafter referred to as the hydraulic plunger 56 and cylinder 57. Compression spring 58 and 59 forming the mechanical spring medium of the buffer arranged end to end surround the hydraulic plunger 56 and cylinder 57. The adjacent ends of the springs bear against a thrust plate 60, the other end of spring 58 bearing against a flange 61 on the hydraulic plunger 56, the outer end of spring 59 bearing against a flange 62 on the cylinder 57 thus urging the hydraulic plunger and cylinder apart, the ends of the hydraulic plunger and cylinder in turn bearing against the closed end of the casing plunger and a spigot 63 projecting inwardly from the closed end of the hydraulic cylinder respectively so that the compression springs also urge the casing plunger and cylinder apart to maintain the buffer extended.

The bore of the hydraulic cylinder 57 in which the hydraulic plunger 56 slides contains a seal 64 co-operating with the plunger and the opposite end is enlarged to form a substantially liquid tight frusto-conical seat 65 against the end of the spigot 63 projecting inwardly from the closed end of the casing cylinder so that the space within the hydraulic cylinder forms a closed chamber 66. During slow closure of the buffer the hydraulic plunger 56 is moved into the hydraulic cylinder pressurizing the liquid within the closed chamber 66 until the pressure acting on the differential area between the hydraulic cylinder bore and the seat 65 formed by the spigot creates a force on the hydraulic cylinder greater than and opposed to the force being exerted by the mechanical spring after which the hydraulic cylinder is moved out of contact with the spigot and liquid is permitted to flow from the closed chamber within the hydraulic cylinder into the liquid reservoir at a controlled pressure. The resistance to slow closure is thus increased above the resistance provided by the spring medium, dependent on the ratio between the effective area of the hydraulic plunger and the differential area hereinbefore referred to.

In order to provide a soft buffer or low resistance during a small initial closure of the buffer the two mechanical springs 58, 59 have different characteristics, one spring being weak and with low rate which becomes coil bound or solid after a predetermined closure.

During heavy impacts of the buffer when greater resistance to closure is required than is provided by the multiple of the spring medium, the liquid forced out of the hydraulic cylinder 57 is made to pass through an orifice or orifices 67 contained within the end wall 68 of an annular continuation 69 of the hydraulic cylinder 57 which forms a further annular closed chamber 70 surrounding the spigot 63 projecting inwardly from the closed end of the casing cylinder 54.

As during extension of the buffer the hydraulic cylinder 57 will be retained in contact with the end of the spigot a non-return valve 71, normally closed during closure of the buffer is able to open and permit liquid to be drawn into the closed chamber within the hydraulic cylinder and it is preferable that the passage 72 connecting this valve to the reservoir chamber should be well below the liquid level when the buffer is normally mounted so that liquid substantially free from air is drawn in.

In the existing construction of hydraulic buffers of the kind with which the invention is concerned and where the hydraulic fluid is used only to provide dynamic resistance it is not essential to provide a complete oil seal between the hydraulic cylinder and the chamber into which the oil is forced after passage through the controlled orifice. With the introduction of the valve as proposed by the present invention it is however preferable to provide a positive liquid tight seal between the hydraulic cylinder and the chamber into which the oil passes when the buffer plunger moves inwardly so that a high resistance to such inward movement can be provided without the buffer plunger creeping.

According to a further embodiment of the invention not illustrated, it is possible for a combination of spring loaded type valve and proportional type valve to be used. In such an arrangement the proportional type valve is utilised to control the pressure up to a predetermined value after which the spring loaded valve becomes effective. The arrangement could be incorporated in the construction disclosed in connection with FIGURE 2 by providing spring loading to the poppet valve the spring action urging the valve to the closed position.

Whilst the above described embodiments of the invention are concerned with buffers, it will be understood that the invention is equally applicable to shock absorbers incorporated in draw-gear by which railway vehicles are coupled together, to absorb traction loads.

I claim:

1. A hydraulic buffer or draw-gear for railway, tramway or like vehicles comprising a cylinder, plunger means movably mounted within said cylinder to form a unit incorporating resilient means to provide resistance and recoil, a liquid chamber having liquid therein disposed in said unit, reservoir means disposed in said unit, passage means interconnecting said liquid chamber and said reservoir means, said passage means including an energy absorbing orifice in said passage means so that when a load is applied to said plunger means liquid is displaced from said liquid chamber into said reservoir means through said passage means and energy absorbing orifice, and pressure operated valve means disposed in said passage means closing said passage means to prevent any flow of liquid from said liquid chamber to said reservoir means until a predetermined liquid pressure has been attained in the liquid chamber whereupon said valve means opens and permits liquid flow at a controlled pressure, the action of said valve means being to raise the force required to move the plunger means inwardly above the recoil force provided by the resilient means.

2. A hydraulic buffer or draw-gear according to claim 1 wherein the valve is a spring loaded type valve arranged to add a predetermined resistance to the spring medium of the buffer throughout the inward stroke of the plunger.

3. A hydraulic buffer or draw-gear according to claim 1 wherein the valve is a proportional type valve which is acted upon by the spring medium of the buffer or draw-gear whereby the resistance can be raised by a predetermined ratio above the spring medium at any point in the working stroke.

4. A hydraulic buffer or draw-gear according to claim 1 wherein the valve comprises a combination of spring loaded type valve and a proportional type valve, the proportional type valve being utilised to control the pressure up to a predetermined value after which the spring loaded valve becomes effective.

5. A hydraulic buffer or draw-gear according to claim 4 wherein an orifice is provided through which the liquid is displaced upon buffer operation, said orifice acting to resist dynamic impact forces.

6. A hydraulic buffer or draw-gear according to claim 5 wherein the valve is arranged in series with the orifice.

7. A hydraulic buffer or draw-gear according to claim 6, wherein a non-return valve is provided which is unseated during outward movement of the plunger to permit the hydraulic fluid to by-pass the said pressure valve and flow in the reverse direction.

8. A hydraulic buffer or draw-gear according to claim 7 wherein a by-pass means is provided in communication with said orifice for permitting the hydraulic fluid to by-pass the valve for a predetermined length of plunger travel in the inward direction.

9. A hydraulic buffer or draw-gear according to claim 8 wherein the by-pass means has a passage which is progressively reduced in area during buffer closure.

References Cited in the file of this patent

UNITED STATES PATENTS

| | | |
|---|---|---|
| 2,914,195 | Pawling | Nov. 24, 1959 |
| 2,994,442 | Frederick | Aug. 1, 1961 |